June 18, 1968     A. J. DE MARIA     3,389,348
GATING SYSTEM FOR HIGH POWER LASER CASCADE
Filed Feb. 7, 1964     2 Sheets-Sheet 1
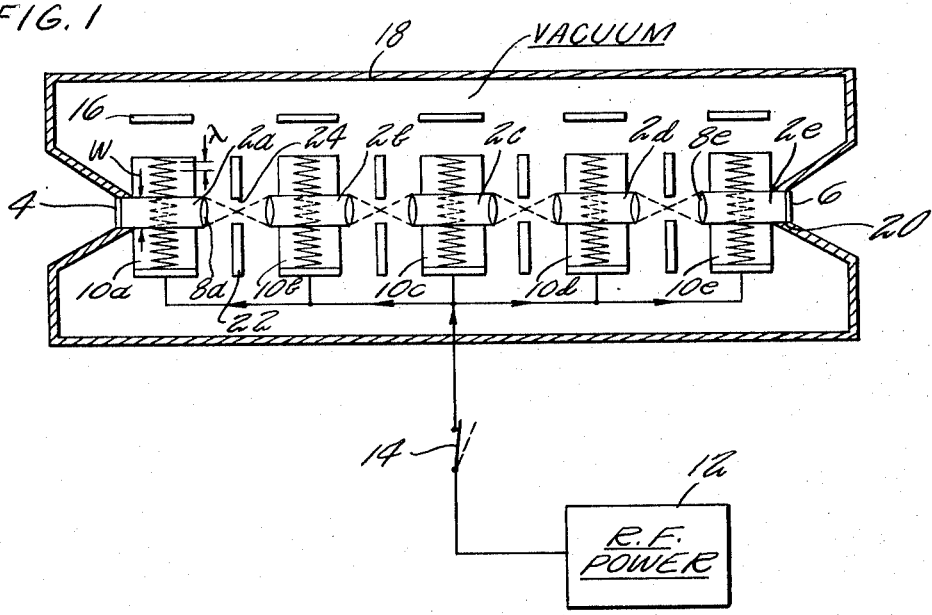
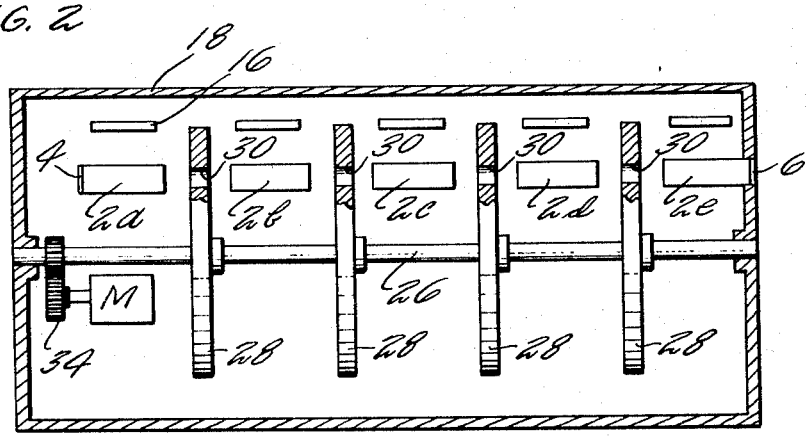
INVENTOR
ANTHONY J. DeMARIA
BY David S. Fishman
ATTORNEY

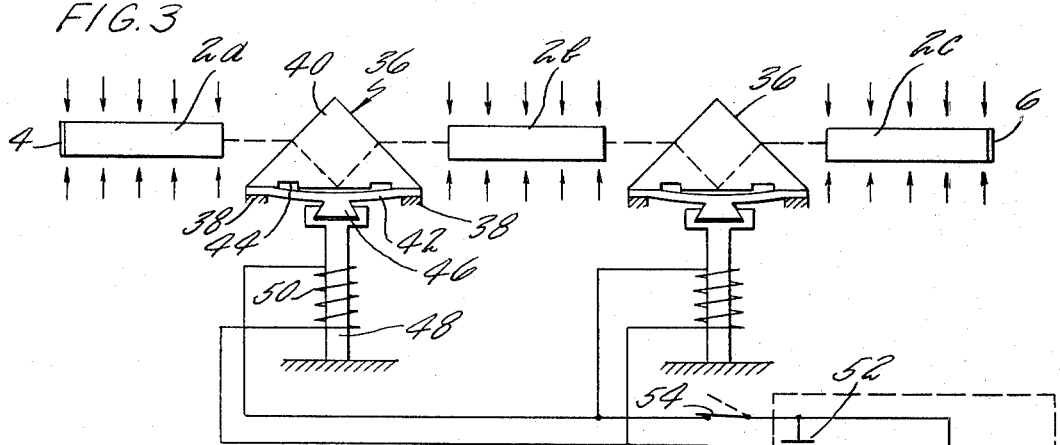
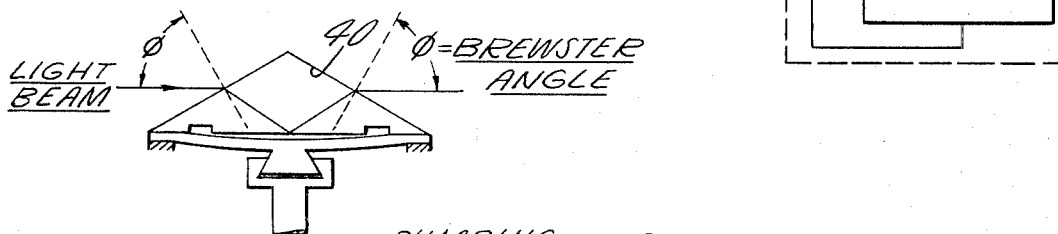
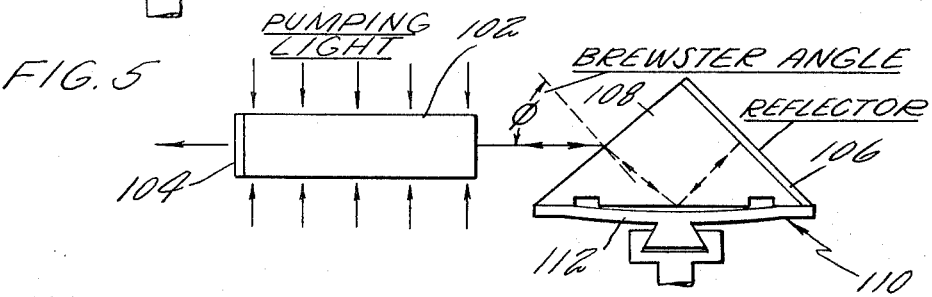
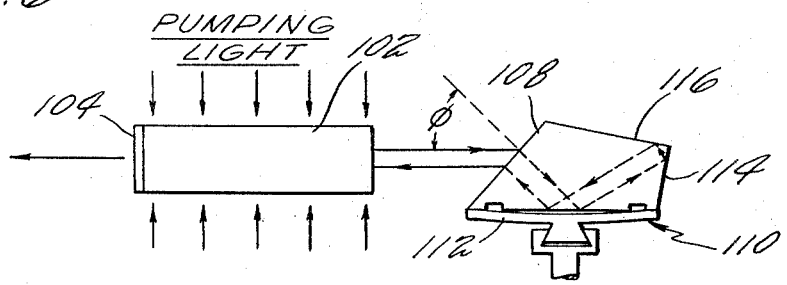

United States Patent Office 3,389,348
Patented June 18, 1968

3,389,348
GATING SYSTEM FOR HIGH POWER LASER CASCADE
Anthony J. De Maria, West Hartford, Conn., assignor to United Aircraft Corporation, East Hartford, Conn., a corporation of Delaware
Filed Feb. 7, 1964, Ser. No. 343,255
7 Claims. (Cl. 331—94.5)

ABSTRACT OF THE DISCLOSURE

A plurality of short laser elements are cascaded optically in series in an optical cavity, and gating means are provided to prevent each laser from oscillating until a high overpopulation is achieved. Inhibiting of the gating means then results in a high power output pulse.

This invention relates to a cascade laser system. More particularly, this invention relates to the cascading of a number of relatively short laser rods, each gated individually, which can be employed as a high peak power laser device when simultaneously gated and as a high repetition rate system when gated sequentially.

The gain of any particular laser element is dependent upon the population of excited atoms and the length of the active laser material, and hence gain and power output can be increased either by greatly overpopulating the excited level or by increasing the length of the active laser element. Present state of the art technology requires that both overpopulation and long active length be employed to obtain the necessary peak power output to use a laser as a weapon. However, the desired peak power output cannot be obtained because long laser elements self-oscillate, even in the absence of reflectors, as the excited population builds up.

In the present invention the problem of achieving the desired great overpopulation while also having an effective long length of active laser element is solved through the cascading of a number of short laser elements, the total length of the short laser elements being equal to the desired length of an active laser element. The gain of each of the short laser elements is insufficient for the elements to become unstable and oscillate without reflectors. Means are provided to prevent each of the short laser elements from oscillating until the overpopulation of the upper level of each element is maximized, and all of the laser elements are then allowed to lase at one time with the result that a gigantic output pulse is achieved. The gating of the individual laser elements is accomplished through the use of an ultrasonic diffraction effect or through the use of the interrupted total internal reflection prism shutter described by V. G. Vafiadi in the Russian journal of "Optics and Spectroscopy," page 377, May 1963.

The ultrasonic diffraction technique and the interrupted total internal reflection prism shutter can also be used to individually gate the elements of the cascade in a predetermined manner to produce a high repetition rate range measuring device or radar device. The serious problems of laser element heating and flash lamp heating usually associated with high repetition rate lasers are overcome since each laser element in the cascade can be pumped at the desired repetition rate divided by the number of elements in the cascade so that the duty cycle for each laser element and the associated flash lamp is reduced by a factor of $1/n$, where $n$ is the number of laser elements in the cascade. Thus, the same cascade of laser elements can be used either as a weapon system or as a high repetition rate system depending upon the manner in which the individual laser elements are gated.

As a further modification, the interrupted total internal reflection prism shutter can be used to gate an individual laser rod, the shutter being located within the optical cavity and being used to selectively control the impingement of electromagnetic radiation on one of the reflectors.

Accordingly, one object of this invention is to produce a novel laser system having an output beam of very high peak power.

Another object of this invention is to produce a novel laser system in which a plurality of relatively short laser elements are arranged in a cascade.

Still another object of the present invention is to produce a novel laser system in which a plurality of laser elements are cascaded for use as a weapon system or as a ranging system.

Still another object of the present invention is to produce a novel laser system in which a cascade of laser elements are gated in a predetermined manner to produce either a high power output beam or a high repetition rate output train.

Other objects and advantages will be apparent from the specification and claims, and from the accompanying drawings which illustrate an embodiment of the invention.

FIG. 1 is a schematic representation of the cascade laser system of the present invention wherein ultrasonic gating means are employed.

FIG. 2 is a schematic representation of the cascade laser system of the present invention wherein rotating discs are employed for gating.

FIG. 3 is a schematic representation of the cascade laser system of the present invention wherein interrupted total internal reflection prism shutters are used for gating.

FIG. 4 is a representative illustration of an interrupted total internal reflection shutter employed in FIG. 3.

FIG. 5 is an illusration of a laser system wherein the interrupted total internal reflection prism shutter is used to gate the output of a single laser element.

FIG. 6 is a modification of the system shown in FIG. 5.

Referring now to FIG. 1, a plurality of active laser elements 2a through 2e are aligned in a cascade along a common axis, the active laser elements being liquid lasers known in the art. The end lasers 2a and 2e have reflectors 4 and 6, respectively, at the remote ends, reflector 4 being more reflective than reflector 6. The reflectors can either be separate elements spaced from or bonded to the lasers or can be reflective coatings at the end surfaces of the lasers. Lenses 8a and 8e are mounted on the inner end of lasers 2a and 2e, respectively, and similar lenses are mounted at both end surfaces of each of the intermediate lasers 2b, 2c, and 2d. Each liquid laser element is partially within an ultrasonic cell, the ultrasonic cells being identified as 10a through 10e to correspond with the associated liquid laser.

The ultrasonic cells are driven by R.F. power oscillator 12 which is connected to a transducer in each ultrasonic cell as shown, the switch 14 in the oscillator output line normally being closed to energize the ultrasonic cells. Pumping energy is delivered to the individual laser elements from lamps 16 associated with each laser, and reflector structure may be provided if desired to concentrate the output from each pumping lamp on the associated laser.

The entire structure described in FIG. 1 is enclosed in a casing 18 within which a vacuum is maintained. Casing 18 has an opening 20 through which the reflectored end of laser 2e passes, and the left end of casing 18 may be similarly constructed to pass the mirrored end of laser 2a. The vacuum is maintained to avoid contamination problems such as dust and to avoid energy loss due to optical breakdown of gas mediums at high laser intensities.

A plate or mask 22 is positioned between each pair of adjacent laser elements, and each mask 22 has an opening 24 to pass a desired or selected portion of the output from the lasers on each side of the mask. The lenses 8 on each side of each mask 22 serve to focus the electromagnetic radiation from the end of the laser element with which each lens is associated on the mask 22 nearest the lens.

The reflectors 4 and 6 at the extreme ends of the cascade of laser elements are the only reflectors in the system and define an optical cavity containing all of the individual laser elements in the cascade. The length of the individual laser elements is selected such that the gain in each element is insufficient to cause self-oscillation at the desired level of optical pumping.

In the operation of the system shown in FIG. 1, switch 14 is normally closed while pumping energy is being delivered from the lamps 16 to the associated active laser elements. Travelling ultrasonic waves are generated in each of the ultrasonic cells, the frequency of oscillator 12 being selected such that the wave length λ of the ultrasonic waves is much less than the width W of the individual laser elements or the output beam of electromagnetic radiation from each element. As a result of this relationship between λ and W, the electromagnetic radiation output from each individual laser element is diffracted, and the diffraction patterns are focused by the lenses 8 on the masks 22, the masks 22 being positioned with respect to the lenses on each side thereof so that only the zero order of each diffraction pattern is focused of the opening 24 of each mask. For example, the diffracted outputs from the right end of element 2a and the left end of 2b are focused on the mask therebetween, the outputs from the right end of 2b and the left end of 2c are focused on the mask therebetween, etc.

It is well known that the intensity of the zero order of an ultrasonically generated diffraction pattern can be varied between normal intensity and zero intensity as a function of the intensity of the ultrasonic wave. That is, the zero order of the diffraction pattern can be suppressed by the proper selection of intensity of the ultrasonic wave, and the intensity of the ultrasonic waves in cells 10a through 10e is selected so that the zero order of each diffraction pattern has effectively zero intensity. Under these conditions, the cascade laser system cannot oscillate since there is no exchange of electromagnetic energy between the individual lasers in the cascade and the necessary feedback for oscillation cannot occur. Since the system cannot oscillate, the excited levels in the individual laser elements become greatly overpopulated. When population is maximized, switch 14 is opened, the ultrasonic field goes to zero, feedback is initiated between end reflectors 4 and 6, electromagnetic energy is exchanged between the individual laser elements through the openings 24 in each mask 22, and lasing action results with a gigantic output pulse.

The fact that the output pulse is truly gigantic can be understood from the following analysis. A single laser element X cm. long pumped at Y joules per centimeter is equivalent in gain and power to $n$ laser elements each of $X/n$ cm. in length as long as each of the $n$ elements is also pumped at Y joules per centimeter and losses due to refractive index discontinuity at the ends are neglected. For the single element X cm. long with an input signal of intensity $I_{in}$ and an output signal of intensity $I_o$, the gain G is $$G = \frac{I_o}{I_{in}} = e^{\alpha X} \qquad (1)$$

where $$\alpha = \sigma(N_2 - N_1)$$

$\sigma$ equals the cross section of the stimulated emission process, and $N_2$ and $N_1$ equal the population of the upper and lower levels respectively.

For the cascade of $n$ elements each $X/n$ cm. long having an initial input signal $I_{in}$ of the same intensity as the single element, the gain in each individual element in the cascade will be $$G = e^{\frac{\alpha X}{n}} \qquad (2)$$

and the total gain in the cascade will be $$G = \Sigma e^{\frac{\alpha n X}{n}} = e^{\alpha X} \qquad (3)$$

Thus, if the cascade is allowed to oscillate normally, the gain and the output intensity are the same in the cascade and in the single laser element.

Referring now to the structure and operation of the FIG. 1 embodiment, the ultrasonic waves passing through the individual laser elements prevent each of the individual elements from breaking into oscillation until the upper level is greatly overpopulated, preferably until the overpopulation is maximized, and switch 14 is then opened to remove the ultrasonic energy waves and allow all of the individual laser elements to lase at once. The great overpopulation results in an increase in peak output intensity of each element when lasing occurs. Assuming that the peak intensity output of each element increases by a factor of F as a result of preventing the individual elements 2a through 2e from oscillating until overpopulation is maximized, a most significant increase in total output intensity results. Designating the output from the individual elements under normal conditions as $I_1$, $I_2$, $I_3$ ... $I_n$, the output from the first element under the overpopulated condition is $$I_1 = FI_{in}e^{\frac{\alpha X}{n}}$$

from the second element is $$I_2 = F^2 I_{in} e^{\frac{2nX}{n}}$$

etc., and the total output $I_o$ from the $n$th element is $$I_o = I_{in} F^n e^{\alpha X} \qquad (4)$$

Thus, assuming that the great overpopulation of the individual elements achieved with the structure and operation of FIG. 1 results in an increase in peak intensity from each rod by a factor of 10, a conservative figure based on known effects of overpopulation, the five element cascade shown in FIG. 1 would have an output of $$I_{in} 10^5 e^{\alpha D}$$

an increase of 100,000 times in peak intensity output over the output obtainable from a single laser having the same total length of active material.

Referring now to FIG. 2 wherein like elements are numbered as in FIG. 1, a second system is shown whereby the significantly large increase in total output intensity can be achieved through an overpopulation technique. The laser elements 2a through 2e, which in this case may be solid elements such as ruby rods, are again aligned in a cascade along a common axis. Each laser element is pumped from a light source 16, and the structure is enclosed within vacuum casing 18. A rotatable shaft 26 is centrally mounted in casing 18 as shown, and a number of discs or plates 28 are secured to shaft 26, there being one disc 28 between each pair of adjacent laser elements. Each disc 28 has an opening 30 therein, and the openings 30 are in close axial and radial alignment. Shaft 26 is rotated by motor 32 through gear train 34, and openings 30 come into alignment with the axially aligned laser elements once in each rotation of shaft 26. The active laser elements are pumped from lamps 16 when the openings 30 are out of alignment with the laser elements, and lasing action cannot take place because the discs 28 interrupt the optical cavity between reflectors 4 and 6. Since lasing does not occur, the individual laser elements become greatly overpopulated, and the extremely large output beam discussed above occurs when the openings 30 become aligned with the laser elements to establish an uninterrupted optical cavity between mirrors 4 and 6 whereby the system oscillates and lasing occurs.

Referring now to FIG. 3 wherein like parts are numbered as in FIG. 1, another modification of the cascade system is shown in which three active laser elements, 2a, 2b and 2c are cascaded in axial alignment in the optical cavity defined between reflectors 4 and 6. Interrupted total internal reflection prism shutters 36, such as those described by V. G. Vafiadi in the Russian journal of "Optics and Spectroscopy," page 377, May 1963 are placed between each two adjacent laser elements. It will be understood that the three active laser elements and the two prism shutters shown in FIG. 3 are for purposes of illustration only, and it will be understood that any number of active laser elements could be cascaded with prisms placed therebetween as shown. Also, the vacuum chamber 18 of FIG. 1 could be provided if needed.

Each prism shutter 36 is mounted on supports 38, and each prism shutter has a transparent glass prism 40 and a thin plate of highly absorbent or scattering glass 42 selected to have an index of refraction identical with the index of refraction of the glass prism portion 40. Plate 42 can be either an opaque glass in which molecular dyes are incorporated to absorb light or can have a roughened lower surface to scatter the light. An annular groove 44 is cut in the bottom of each prism to define a central portion on the bottom of the prism with which it is desired to make contact with plate 42 and to facilitate separation between plate 42 and the prism. Plate 42 is ground optically flat as is the portion of each prism encircled by annular groove 44, and plate 42 is in optical contact with the bottom of prism 40 when plate 42 is not deformed.

The shutter can be actuated, i.e., plate 42 deformed and moved out of contact with the bottom of prism 40, in various ways such as by electromagnetic, electrodynamic, magnetostrictive, or other systems. A magnetostrictive system is shown in FIG. 3 in which a dovetail lug 46 is engaged by a corresponding slot in a nickel rod 48, rod 48 being supplied with current pulses from a source such as capacitor discharge power supply 52 when switch 54 is closed. An individual coil 50 is wound around each rod 48, and the coils 50 are connected in parallel to capacitor discharge 52.

When switch 54 is open the shutters 36 are closed. That is, the rods 48 are at their full extended length and each plate 42 is in optical contact with the central region of its associated prism 40. Pumping light indicated by the arrows is delivered to the individual laser elements, and spontaneous electromagnetic radiation emanating from the ends of the laser elements impinges on the sides of the prisms as shown by the dashed lines. The right end of laser element 2a and the left end of laser element 2b deliver electromagnetic radiation to the prism therebetween, and the right end of laser element 2b and the left end of laser element 2c deliver electromagnetic radiation to the prism therebetween. The light incident on the sides of each prism is refracted toward the central region and enters plate 42 where it is absorbed or scattered; no internal reflection takes place because the light incident on the bottom of each prism 40 does not encounter an interface between media of different refractive indices. Since the internal electromagnetic radiation is absorbed in this fashion, there is no feedback between the reflectors of the optical cavity, lasing action does not occur, and the laser elements become greatly overpopulated.

The closing of switch 54 delivers a current pulse to each coil 50, and each nickel rod undergoes magnetostriction whereby its length is reduced over the section experiencing the field of the coil. An elastic compression wave propagates along each rod 48 from the compressed section, and when this compression wave reaches the end of the rod near the prism the constriction of the rod deforms plate 42 to break contact between each plate 42 and the central region of the associated prism. Each plate 42 has to move only a small fraction of an optical wave length for the shutter to open. When contact is broken between plate 42 an the central region of the associated prism, the light incident on the central region of each prism encounters a change in refractive index, is reflected, and passes through the prism to the adjacent laser element as shown by the dashed line path. The simultaneous deforming of each plate 42 opens each prism shutter and establishes a continuous reflecting path between end reflectors 4 and 6 so that feedback occurs, and the system lases with a high intensity output from the greatly overpopulated individual laser elements.

Close synchronization of the opening of each of the shutters 36 can be obtained by moving the individual coils 50 along the corresponding rod 48 until the travel time for the elastic compressional wave is equal for each rod. Also, the structure of FIG. 3 can be used as an "and" gate wherein independent signals are delivered to the coils 50, and lasing will not occur unless signals are delivered simultaneously to all the coils 50.

FIG. 4 shows a preferred construction for the prism element 40 when the interrupted total internal reflection shutter is used to gate laser elements. As can be seen from FIG. 4, the preferred construction is in contouring the sides of prism 40 so that electromagnetic radiation is incident on the sides of the prism at the Brewster angle, $\phi$, for the particular wave length of electromagnetic radiation involved. Also, the radiation is incident on the central region at an angle greater than the critical angle for total internal reflection.

FIG. 5 shows an embodiment wherein an interrupted total internal reflection prism shutter is used to gate an individual laser element. The laser element 102 has one reflector 104 associated with one end surface. The second reflector, reflector 106 is bonded to or deposited on the far surface of prism 108 of interrupted total internal reflection shutter 110. The reflectors 104 and 106 define the optical cavity for laser element 102, and it can be seen that shutter 110 is located within the optical cavity. The details of shutter 110 are similar to shutter 36 described above, and shutter 110 can be actuated in a manner similar to that described for the actuation of shutter 36.

When plate 112 is allowed to stay in contact with the bottom of the central portion of prism 108, the spontaneous electromagnetic radiation in the optical cavity is absorbed by plate 112 and lasing action does not occur. When plate 112 is deformed to break contact between plate 112 and prism 108, the electromagnetic radiatoin is reflected from the central portion of the prism perpendicular to reflector 106 and then back to laser element 102 so that feedback is initiated and lasing action occurs with an output beam through reflector 104. It will be readily apparent that the output from laser 102 can be gated in any desired fashion depending upon the manner in which contact is made and broken between plate 112 and the central portion of prism 108.

FIG. 6 shows a modified version of the system shown in FIG. 5, and similar elements are numbered as in FIG. 5. The system of FIG. 6 differs from the FIG. 5 embodiment in that prism 108 has been modified so that reflector 106 of FIG. 5 is eliminated and replaced by surfaces 114 and 116 which cooperate with the central portion at the base of prism 108 to define a path of total internal reflection as illustrated by the arrows. The reflection accomplished by surfaces 114 and 116 cooperates with reflector 104 to define the optical cavity for the system in FIG. 6.

Returning now to a consideration of the embodiments of FIG. 1 and FIG. 3, it will be understood that an alternating or modulated signal from power supply 12 of FIG. 1 or power supply 52 of FIG. 3 will cause the output of the respective laser systems to pulsate in synchronization with the alternating or modulated signal.

The FIG. 1 and FIG. 3 embodiments can also be used to generate high repetition rate pulse trains while greatly reducing the major problems of laser rod heating and flash lamp heating if four-lever laser elements are used. If it is desired to generate a repetition rate of X pulses per second, each of the active laser elements can be pumped at the repetition rate X divided by the number of active laser elements in the cascade. Thus, for a cascade of $n$ laser elements, the duty cycle for each active laser element and its respective flash lamp becomes $1/n$ times the initial desired repetition rate.

In the FIG. 1 embodiment, ultrasonic energy can be propagated through all laser elements or any one laser element to control the repetition rate. As long as ultrasonic energy is propagated through any one laser element the optical cavity will be interrupted and lasing will not occur. Thus, if desired, the FIG. 1 embodiment could be programmed so that ultrasonic energy was propagated through only that laser element next to be fired in the high repetition rate embodiment, and lasing would occur when the ultrasonic energy was removed. Similarly, the FIG. 3 embodiment requires the opening of all shutters in order for any or all of the laser elements to lase, and the laser elements can be individually pumped in a predetermined manner to provide the low duty cycle for each laser and pumping source while maintaining the high repetition rate for the system. Once again, gating could be accomplished by periodically opening all shutters, or by periodically opening and closing any one shutter while all other shutters remained open, or by sequentially opening and closing selected shutters in coordination with the pumping of individual elements while all other shutters remain open.

It is to be understood that the invention is not limited to the specific embodiment herein illustrated and described but may be used in other ways without departure from its spirit as defined by the following claims.

I claim:
1. A cascade laser system including a plurality of active laser elements connected optically in series reflecting means associated with each of the end elements of said plurality of active laser elements, said reflecting means defining an optical cavity containing said plurality of active laser elements, means for supplying pumping energy to said active laser elements, a mask between each active laser element and the adjacent laser element, each of said masks having an opening therein, means for focusing electromagnetic radiation from each of said active laser elements on said masks, means for passing ultrasonic energy waves through each of said active laser elements to diffract the output of each of said active laser elements into orders, said masks passing only the zero order of said diffracted outputs, means for modulating the intensity of said ultrasonic waves to produce a zero intensity in said zero order, and means for further modulating the intensity of said ultrasonic waves to cause lasing action.

2. A cascade laser system as in claim 1 wherein said active laser elements are liquid lasers, and wherein the openings in said mask are in substantial axial alignment, and wherein said focusing means includes lens means for focusing the zero order of the diffracted output of each active laser element on said opening, and wherein said modulating means includes means for modulating the intensity of said ultrasonic waves.

3. A cascade laser system as in claim 1 wherein said means for passing ultrasonic waves includes ultrasonic cell means for passing said ultrasonic waves through said active laser elements, and including a casing defining a vacuum chamber containing said laser system, said vacuum chamber casing having window means for the passage of laser output.

4. A cascade laser system comprising:
a plurality of laser elements connected optically in series in an array,
reflecting means positioned at each end of said array of laser elements to form an optical cavity containing all of said laser elements,
means for simultaneously pumping said laser elements,
an ultrasonic cell connected with each of said laser elements,
means for generating an ultrasonic wave in each of said cells, the ultrasonic wave in each cell being coupled into the laser element associated therewith to diffract the electromagnetic radiation in each said laser element into orders and prevent oscillation of said laser elements,
and means for inactivating said ultrasonic wave generating means to produce simultaneous oscillation of all of said laser elements and generate a single high power output pulse.

5. A cascade laser system as in claim 4 and including means to vary the intensity of said ultrasonic wave to produce a zero intensity in said zero order diffracted waves.

6. A cascade laser system as in claim 5 and including a mask positioned between each pair of adjacent laser elements for transmitting only the zero diffracted order between adjacent laser elements.

7. A cascade laser system as in claim 4 in which said means for inactivating said ultrasonic wave generating means includes means for reducing the intensity of said ultrasonic waves to zero.

References Cited

UNITED STATES PATENTS

| 3,247,386 | 4/1966 | Vickery | 331—94.5 X |
| 3,247,467 | 4/1966 | Geusic et al. | 331—94.5 |
| 3,256,443 | 6/1966 | Moore | 331—94.5 X |
| 3,289,099 | 11/1966 | Masters | 331—94.5 |
| 3,297,876 | 1/1967 | De Maria | 331—94.5 X |
| 3,292,102 | 12/1966 | Byrne | 331—94.5 |

JEWELL H. PEDERSEN, *Primary Examiner.*

E. S. BAUER, W. L. SIKES, *Assistant Examiners.*